United States Patent [19]

Moore et al.

[11] Patent Number: 4,602,064

[45] Date of Patent: Jul. 22, 1986

[54] GRAFTED RUBBER CONCENTRATES FOR USE IN IMPACT RESISTANT POLYMERS

[75] Inventors: Eugene R. Moore, Midland, Mich.; Maxmilian J. deFreitas, Houston, Tex.

[73] Assignee: The Dow Chemical Company, Midland, Mich.

[21] Appl. No.: 676,683

[22] Filed: Nov. 30, 1984

[51] Int. Cl.$^4$ .............................................. C08F 279/02
[52] U.S. Cl. ...................................... 525/316; 525/310
[58] Field of Search ................................ 525/316, 310

[56] References Cited

U.S. PATENT DOCUMENTS 4,243,765 1/1981 Keskkula et al. .
4,263,420 4/1981 Bracke .................................. 525/316
4,325,856 4/1982 Ishikawa et al. .

Primary Examiner—Paul R. Michl
Attorney, Agent, or Firm—Tom J. Mielke

[57] ABSTRACT

This invention relates to an improved method for forming a grafted rubbery particle suitable for use as a reinforcing rubber in a thermoplastic resin. The grafted rubbery particles produced by the method of the present invention have a substantially continuous, generally uniform layer of polymer grafted to the rubber particle core.

26 Claims, No Drawings

GRAFTED RUBBER CONCENTRATES FOR USE IN IMPACT RESISTANT POLYMERS

Rubber-reinforced polymers, particularly those containing styrene/acrylonitrile and a reinforcing rubber, are well-known in the art. These rubber reinforced polymers are manufactured in a variety of ways. One method of preparation is to polymerize styrene and acrylonitrile in the presence of rubber, for example by a mass or bulk polymerization process to obtain a rubber reinforced styrene-acrylonitrile resin. Alternatively, such polymers are produced by blending heat-plastified reinforcing rubber with heat-plastified resin.

In view of the wide variety of end use applications for rubber reinforced polymers, it is advantageous to prepare said polymers in such a manner that the reinforcing rubber level may be readily varied. The blending technique of preparing rubber reinforced polymers is particularly desirable since it readily permits the reinforcing rubber level to be varied without the necessity of adjusting complex polymerization conditions. Further, the blending technique allows the size and distribution of the rubber reinforcing particles to be easily varied.

It is well-known and established that for optimum reinforcement of a polymer system, such as copolymers of styrene and acrylonitrile, that it is desirable that some styrene/acrylonitrile polymer be chemically attached to the reinforcing rubber. Prior art processes for grafting styrene/acrylonitrile polymers to the reinforcing rubber particles have been unsatisfactory in that they result in a discontinuous, non-uniform grafted reinforcing rubber particle. That is, the layer of styrene/acrylonitrile polymer surrounding the reinforcing rubber particle is not continuous and is not of a uniform thickness.

It would be desirable to produce a rubber reinforcing particle having a substantially continuous, generally uniform layer of styrene/acrylonitrile polymer grafted thereto. It is to this goal that the present invention is directed.

SUMMARY OF THE INVENTION

The present invention concerns a process for preparing a latex of grafted copolymer particles and the latex prepared by said process. The steps of the process comprise:

(a) providing a first generally hydrophobic monomer mixture, said mixture comprising a monovinylidene aromatic monomer, a conjugated diolefin, and an ethylenically unsaturated nitrile monomer;

(b) forming an aqueous suspension by suspending the first generally hydrophobic monomer mixture in an aqueous phase;

(c) adding to the aqueous suspension an amount of hydrophilic monomer, the amount being sufficient to provide a generally hydrophilic surface on a polymer to be prepared from the monomers in the aqueous suspension;

(d) initiating polymerization of the monomers present in the aqueous suspension to form an aqueous suspension of partially polymerized monomers;

(e) providing a second generally hydrophobic monomer mixture, said mixture comprising a monovinylidene aromatic monomer, a conjugated diolefin, and an ethylenically unsaturated nitrile monomer;

(f) adding the second generally hydrophobic monomer mixture to the aqueous suspension of partially polymerized monomers;

(g) providing a graft polymerization base by continuing polymerization of the monomers present in the aqueous suspension until achieving a conversion of monomer to polymer of at least 50 percent; and (h) graft polymerizing, to the graft polymerization base, one or more monomers selected from the group consisting of monovinylidene aromatic monomers, ethylenically unsaturated nitrile monomers, and monoethylenically unsaturated carboxylic acid monomers.

DETAILED DESCRIPTION OF THE INVENTION

The polymer particles of the latexes of the present invention can be characterized as generally spheroidal particles having an elastomeric core said core having grafted thereto a rigid polymer phase. The present invention concerns an improved process for preparing the latexes and the latexes produced by said process. The improvement comprises polymerizing the elastomeric core, of generally hydrophobic monomers, in a manner which provides the core with a thin hydrophilic outer layer. This thin hydrophilic outer layer being sufficient to encourage the subsequent substantially continuous, generally uniform grafting of rigid phase monomers thereto.

The elastomeric core of the particles of the present invention is polymerized from a monovinylidene aromatic monomer, a conjugated diolefin, and an ethylenically unsaturated nitrile monomer.

The term "monovinylidene aromatic monomer" is intended to include those monomers wherein a radical of the formula

(wherein R is hydrogen or a lower alkyl such as an alkyl having from 1 to 4 carbon atoms) is attached directly to an aromatic nucleus containing from 6 to 10 carbon atoms, including those wherein the aromatic nucleus is substituted with alkyl or halogen substituents. Typical of these monomers are styrene; alpha-methylstyrene; ortho-, meta-, and para-methylstyrene; ortho-, meta-, and para-ethylstyrene; o,p-dimethylstyrene; o,p-diethylstyrene; isopropylstyrene; o-methyl-p-isopropylstyrene; p-chlorostyrene; p-bromostyrene; o,p-dichlorostyrene; o,p-dibromostyrene; vinylnaphthalene; diverse vinyl(alkylnaphthalenes); and vinyl(halonaphthalenes); and comonomeric mixtures thereof.

Because of considerations such as cost, availability, ease of use, etc., styrene is the preferred monovinylidene aromatic monomer. The monovinylidene aromatic monomer constitutes from about 0 to about 40, preferably from about 0 to about 15 weight percent of the first and second generally hydrophobic monomer mixtures.

The term "conjugated diolefin" is meant to include 1,3-butadiene; 2-methyl-1,3-butadiene; 2,3-dimethyl-1,3-butadiene; pentadiene; 2-neopentyl-1,3-butadiene; and other hydrocarbon analogs of 1,3-butadiene; and, in addition, the substituted 1,3-butadienes, such as 2-chloro-1,3-butadiene; 2-cyano-1,3-butadiene; the substituted straight chain conjugated pentadienes; the straight chain and branched chain conjugated hexadienes; other straight and branched chain conjugated dienes having from 4 to about 9 carbon atoms; and comonomeric mixtures thereof.

The cost, ready availability, and excellent properties of interpolymers produced therefrom, makes 1,3-butadiene the most preferred conjugated diolefin for use in the present invention. The conjugated diolefin constitutes from about 50 to about 100, preferably, from about 70 to about 100, and most preferably from about 85 to 96 weight percent of the first and second generally hydrophobic monomer mixture.

The term "ethylenically unsaturated nitrile monomer" is meant to include acrylonitrile, methacrylonitrile, ethacrylonitrile, and the like, and mixtures thereof. The ethylenically unsaturated nitrile monomer is present in an amount of from about 0 to about 15 weight percent, preferably from about 0 to about 5 weight percent of the first and second generally hydrophobic monomer mixtures. The cost, and ready availability, make acrylonitrile the most preferred ethylenically unsaturated nitrile monomer for use in the present invention.

The monomers of the first generally hydrophobic monomer mixture are emulsified in water with the aid of micell-forming emulsifying agents. The resultant aqueous suspension usually contains a suitable water soluble free radical-generating catalyst such as a peroxide or a persulfate. Additionally, a modifier or regulator, such as a mercaptan, may be present in small amounts. The modifier acts as a chain transfer agent and limits the growth of the polymer chains.

Suitable emulsifying agents which can be employed in the practice of the present invention include anionic, cationic, and non-ionic emulsifiers customarily used in emulsion polymerization. Usually at least one anionic emulsifier is included and one or more non-ionic emulsifiers can also be present.

Representative types of anionic emulsifiers are the alkylaryl sulfonates, alkali metal alkyl sulfates, the sulfonated alkyl esters, the fatty acid soaps and the like. Specific examples of these well-known emulsifiers include dodecylbenzene sodium sulfonate, sodium butylnaphthalene sulfonate, sodium lauryl sulfate, disodium dodecyl diphenyl ether disulfonate, N-octadecyl disodium sulfosuccinate, and dioctyl sodium sulfosuccinate.

The emulsifying agents can be employed in varying amounts so long as adequate emulsification is achieved to provide elastomeric core particles of the desired particle size and particle size distribution. As a general rule, the emulsifying agents are present in an amount of from about 0.02 to 0.4 weight percent, based upon the total monomer to be polymerized.

Molecular weight modifiers may be employed in the polymerization step of the present invention. The molecular weight modifiers are present in an amount from 0 percent to about 10 percent by weight based upon the total weight of monomer to be polymerized.

Suitable molecular weight modifiers include n-octyl mercaptan, cyclohexyl mercaptan, dipentene dimercaptan, n-butyl mercaptan, n-dodecyl mercaptan, tertiary dodecyl mercaptan, isooctyl thioglycolate, pinanyl mercaptan, pentaerythritol-tetra(3-mercaptopropionate), ethyl cyclohexyl dimercaptan, allyl bromide, carbontetrachloride, bromotrichloromethane, and beta-bromostyrene. Other suitable molecular weight modifiers include: methyl mercaptan, ethyl mercaptan, 1-propyl mercaptan, 2-propyl mercaptan, 1-butyl mercaptan, 2-butyl mercaptan, 1-pentyl mercaptan, 2-pentyl mercaptan, 3-pentyl mercaptan, 1-hexyl mercaptan, 1-heptyl mercaptan, tertiary nonyl mercaptan, n-decyl mercaptan, secondary undecyl mercaptan, secondary dodecyl mercaptan, and terpenes such as terpinolene and limonene and mixtures of the foregoing regulators.

Suitable free radical generating initiators or catalysts include water-soluble persulfate or peroxy compounds and water-soluble redox systems, preferably potassium, sodium, or amonium peroxydisulphate or hydrogen peroxide, in combination with a reducing agent, such as sodium metabisulphite, sodium thiosulfate, sodium bisulphite, sodium formaldehyde sulfoxylate, sodium dithionate, sodium hypophosphite, ferrous sulfate, ferrous nitrate, water-soluble amines, for example triethylamine, triethanolamine, which acts as an accelerator. The preferred water-soluble persulfate compound is sodium or potassium persulfate. Oil soluble initiators such as cumene hydroperoxide, azobisisobutyronitrile, tertiary butyl hydroperoxide, paramethanehydroperoxide; benzoyl peroxide and the like may be used.

The amount of free radical generating initiator or catalyst used is within the limits considered normal for polymerization reactions of this type, i.e., between 0.01 and 5 weight percent, based on the total monomer to be polymerized.

Finally, the first generally hydrophobic monomer mixture may contain other modifiers, including plasticizers, stabilizers, lubricants, dye, pigments, and fillers, provided they do not chemically react with or otherwise adversely affect the ingredients of the first generally hydrophobic monomer mixture.

An amount of hydrophilic monomer is added to the aqueous suspension. Suitable hydrophilic monomers include: acrylonitrile, methacrylonitrile and methyl methacrylate. The preferred hydrophilic monomer is acrylonitrile.

The hydrophilic monomer is added in an amount sufficient to provide a generally hydrophilic surface on a polymer to be prepared from the monomers present in the aqueous suspension. Suitably, the hydrophilic monomer is added in an amount from about 0.1 to about 5 weight percent based on total weight of the aqueous phase and the first generally hydrophobic monomer mixture. In one preferred embodiment of the present invention wherein the hydrophilic monomer is acrylonitrile, the acrylonitrile is present in an amount from about 0.2 to about 2.3 weight percent based on total weight of the aqueous phase and first generally hydrophobic monomer mixture.

Polymerization of the monomers present in the aqueous suspension is then initiated, to form an aqueous suspension of partially polymerized monomers. Polymerization is carried out under suitable conditions such as, for example, from about 0° C. to about 100° C. and autogenous pressure.

In one embodiment of the present invention, the polymerization of the monomers present in the aqueous suspension of partially polymerized monomers is halted prior to the addition of the second generally hydrophobic monomer mixture. After halting the polymerization, the polymerized monomers are steam stripped to remove excess monomers. The latex thus recovered may be stored for extended periods of time. After which time the latex may be reinitiated and the process continued with the addition of the second generally hydrophobic monomer mixture. For the purpose of this application, the phrase "aqueous suspension of partially polymerized monomers" is intended to encompass the situation wherein the polymer present in the aqueous suspension of partially polymerized monomers is steam stripped, stored and later reinitiated as well as the situation wherein the polymer present in the aqueous suspension of partially polymerized monomers is not steam stripped, stored and later reinitiated but instead, has the second generally hydrophobic monomer mixture added directly thereto.

A second generally hydrophobic monomer mixture is provided. The second generally hydrophobic monomer mixture comprises a monovinylidene aromatic monomer, a conjugated diolefin, and an ethylenically unsaturated nitrile monomer.

The monovinylidene aromatic monomers suitable for use in the second generally hydrophobic monomer mixture are the same as those hereinbefore set forth as suitable for use in the first generally hydrophobic monomer mixture. The conjugated diolefins suitable for use in the second generally hydrophobic monomer mixture are the same as those hereinbefore set forth as suitable for use in the first generally hydrophobic monomer mixture. The ethylenically unsaturated nitrile monomers suitable for use in the second generally hydrophobic monomer mixture are the same as those hereinbefore set forth as suitable for use in the first generally hydrophobic monomer mixture.

The monovinylidene aromatic monomer is present in the second generally hydrophobic monomer mixture in an amount of from about 0 to about 40, preferably from about 0 to 15 weight percent based on total weight of the second generally hydrophobic monomer mixture. The conjugated diolefin monomer is present in the second generally hydrophobic monomer mixture in an amount from about 50 to about 100, preferably from about 70 to about 100, and most preferably from about 85 to about 96 weight percent based on total weight of the second generally hydrophobic monomer mixture. The ethylenically unsaturated nitrile monomer is present in the second generally hydrophobic monomer mixture in an amount of from about 0 to about 15, preferably from about 0 to about 5 weight percent based on total weight of the second generally hydrophobic monomer mixture.

Additionally, the second generally hydrophobic monomer mixture may contain additives, e.g., free radical generating catalysts, molecular weight modifiers or regulators, and the like, as hereinbefore set forth as suitable for inclusion in the first generally hydrophobic monomer mixture.

The second generally hydrophobic monomer mixture is added to all or part of the aqueous suspension of partially polymerized monomers. In those cases where only part of the aqueous suspension of partially polymerized monomers is used, the remaining portion can be reserved and used in a later, separate process as the aqueous suspension of partially polymerized monomers. For ease of controlling the polymerization rate, it is preferred that the second generally hydrophobic monomer mixture be added to the aqueous suspension of partially polymerized monomers gradually over a length of time. The length of time over which the second generally hydrophobic monomer mixture is added to the aqueous suspension of partially polymerized monomers is suitably from about 1 to about 24 hours.

In one preferred embodiment of the present invention the first generally hydrophobic monomer mixture and the second generally hydrophobic monomer mixture are nearly identical in composition. Moreover, the first generally hydrophobic monomer mixture represents from about 0 to about 25, preferably from about 0 to about 15 weight percent of the total combined weight of the first and second generally hydrophobic monomer mixture.

In another preferred embodiment of the present invention a single generally hydrophobic monomer mixture is provided, said mixture comprising a monovinylidene aromatic monomer, a conjugated diolefin, and an ethylenically unsaturated nitrile monomer. The generally hydrophobic monomer mixture is then divided into a first portion and second portion, said first portion being the functional equivalent of the first generally hydrophobic monomer mixture said second portion being the functional equivalent of the second generally hydrophobic monomer mixture.

A graft polymerization base is provided by continuing polymerization of the monomers present in the aqueous suspension of the partially polymerized monomers until achieving a conversion of monomer to polymer of at least 50 percent. The unreacted monomers, optionally, may be removed from the aqueous suspension of partially polymerized monomers prior to the graft polymerization step by any of the conventional monomer removal methods. The graft polymerization bases have particle diameters ranging in size from about 300 to about 5000, preferably from about 500 to about 2000 Angstroms; the foregoing values being number average values.

The graft polymerization bases have graft polymerized thereto one or more monomers selected from the group consisting of monovinylidene aromatic monomers, ethylenically unsaturated nitrile monomers, and monoethylenically unsaturated esters of carboxylic acid monomers.

Prior to the graft polymerization process, all or part of the graft polymerization bases may be destabilized and caused to agglomerate into groups of graft polymerization bases. Methods of destabilizing the graft polymerization bases are well-known in the art and include freeze agglomeration, shear agglomeration, chemical agglomeration, etc.

The monovinylidene aromatic monomers suitable for graft polymerization to the graft polymerization bases are the same as those hereinbefore described as being suitable for inclusion in the first generally hydrophobic monomer mixture. The ethylenically unsaturated nitrile monomers suitable for graft polymerization to the graft polymerization bases are the same as those hereinbefore described as being suitable for inclusion in the first generally hydrophobic monomer mixture.

Suitable ethylenically unsaturated esters of carboxylic acid monomers include methyl acrylate, methyl methacrylate, ethyl acrylate, ethyl methacrylate, 2-chloroethyl methacrylate, propylacrylate or methacrylate, n-butyl acrylate or methacrylate, 2-ethylhexyl acrylate, and the like. For reasons of cost and ease of use, the preferred ethylenically unsaturated carboxylic acid monomer is methyl methacrylate.

In one preferred embodiment of the present invention, the graft polymerization bases have graft polymerized thereto a major portion of styrene and a minor portion of acrylonitrile. The acrylonitrile being present in an amount of from about 0 to about 40, preferably from about 20 to about 40 and, most preferably from about 25 to about 35 weight percent based on total weight of the graft polymers.

The grafted copolymer particles are prepared by emulsion polymerization of the graft monomers in the presence of an emulsion of the graft polymerization bases by known techniques which favor the formation of a rigid thermoplastic polymer shell around the graft polymerization base rather than discrete particles of rigid polymers separate from the graft polymerization base.

The following examples are intended as illustrations only and are not to limit, in any manner, the inventions set forth in the claims.

EXAMPLE 1

A 200 gallon glass-lined jacketed reactor was charged with 50 gallons of deionized water, 590 grams of a 43 percent solution of sodium dodecylbenzene-sulfonate, and 136 grams of sodium bicarbonate. The reactor was then sealed and tested for leaks at 30° C. The reactor was purged of oxygen by pressurizing said reactor with nitrogen to about 60 psig and then evacuating the nitrogen to a vacuum of about 150 millimeters of mercury. The process of pressurizing the reactor with nitrogen and evacuating was performed a total of three times.

After purging the reactor of oxygen, 2.27 kilograms of acrylonitrile were added to the reactor. Immediately after the addition of the acrylonitrile, 21.32 kilograms of a monomer mixture were added to the reactor. The monomer mixture comprised 5.0 parts styrene, 0.6 parts normal octyl mercaptan, 2.0 parts acrylonitrile and 93 parts butadiene. An initiator shot comprised of 284 grams of sodium persulfate dissolved in 284 grams of deionized water was then quickly pumped into the reactor.

The temperature of the reactor was increased to approximately 65° C. over a period of about one-half hour. The reactor was maintained at a temperature of approximately 65° C. for about 50 minutes. At the end of this time period 121.1 kilograms of a monomer mixture were continuously added to the reactor at a rate of about 24.5 kilograms per hour. The monomer mixture comprised 5.0 parts styrene, 0.6 parts normal octyl mercaptan, 2.0 parts acrylonitrile, and 93 parts butadiene. At the same time the monomer mixture was being continuously added to the reactor, an aqueous mixture was being added to the reactor. The aqueous mixture comprised 98.88 kilograms of deionized water and 9.84 kilograms of a 43 percent aqueous solution of sodium dodecylbenzenesulfonate. The aqueous mixture was added at a rate of approximately 21.0 kilograms per hour until approximately 108.72 kilograms of the aqueous mixture were added to the reactor.

The reaction was allowed to continue until the butadiene pressure within the reactor decreased to about 20 psig. At this point, samples of the resultant latex were removed and found to have a solids content of 28.17 percent by weight, a pH of 8.8, and an average particle size of 1,280 Angstroms.

The reaction temperature was then increased to 70° C. At this point, a first and second reactant stream were added to the reactor.

The first reactant stream contained a monomer mixture comprised of 69.2 parts styrene, 30.80 parts of acrylonitrile, and 0.34 parts of normal octyl mercaptan. The first reactant stream was added to the reactor at a rate of about 35.68 kilograms per hour for approximately four hours until a total of 142.65 kilograms had been added.

The second reactant stream comprised 136 grams of sodium persulfate dissolved in 92.67 kilograms of deionized water. The second reactant stream was added to the reactor at a rate of approximately 23.2 kilograms per hour for about four hours until a total of 92.8 kilograms had been added.

The reaction was allowed to continue for approximately one and one-half hours after the addition of the first and second reactant streams had been completed. At this point, a mixture comprising 2.72 kilograms of a polysiloxane anti-foam solution, commercially available from The Dow Corning Corporation under the trade designation FG 10; 5.67 kilograms of deionized water; and 0.09 kilograms of ethylene diamine tetraacetic acid was added to the reactor vessel.

Transmission electron micrographs revealed grafted rubber particles having a substantially continuous, generally uniform graft layer.

As is apparent from the foregoing specification, the present invention is susceptible of being embodied with various alterations and modifications which may differ particularly from those that have been described in the preceding specification and description. For this reason, it is to be understood that all of the foregoing is intended to be merely illustrative and is not to be construed or interpreted as being restrictive or otherwise limiting of the present invention, excepting as it is set forth and defined in the following claims.

What is claimed is:

1. A process for preparing a latex of grafted copolymer particles, the steps of the process comprising:
    (a) providing a first generally hydrophobic monomer mixture, said mixture comprising a monovinylidene aromatic monomer, a conjugated diolefin, and an ethylenically unsaturated nitrile monomer;
    (b) forming an aqueous suspension by suspending the first generally hydrophobic monomer mixture in an aqueous phase;
    (c) adding to the aqueous suspension an amount of hydrophilic monomer, the amount being sufficient to provide a generally hydrophilic surface on a polymer to be prepared from the monomers in the aqueous suspension;
    (d) initiating polymerization of the monomers present in the aqueous suspension to form an aqueous suspension of partially polymerized monomers;
    (e) providing a second generally hydrophobic monomer mixture, said mixture comprising a monovinylidene aromatic monomer, a conjugated diolefin, and an ethylenically unsaturated nitrile monomer;
    (f) adding the second generally hydrophobic monomer mixture to the aqueous suspension of partially polymerized monomers;
    (g) providing a graft polymerization base by continuing polymerization of the monomers present in the aqueous suspension of partially polymerized monomers until achieving a conversion of monomer to polymer of at least 50 percent; and
    (h) graft polymerizing to the graft polymerization base one or more monomers selected from the group consisting of monovinylidene aromatic monomers, ethylenically unsaturated nitrile monomers, and monoethylenically unsaturated carboxylic acid monomers.

2. The process of claim 1 wherein the monovinylidene aromatic monomer of the first and second generally hydrophobic monomer mixture is styrene.

3. The process of claim 1 wherein the conjugated diolefin of the first and second generally hydrophobic monomer mixture is 1,3-butadiene.

4. The process of claim 2 wherein the conjugated diolefin of the first and second generally hydrophobic monomer mixture is 1,3-butadiene.

5. The process of claim 1 wherein the ethylenically unsaturated nitrile monomer of the first and second generally hydrophobic monomer mixture is acrylonitrile.

6. The process of claim 2 wherein the ethylenically unsaturated nitrile monomer of the first and second generally hydrophobic monomer mixture is acrylonitrile.

7. The process of claim 3 wherein the ethylenically unsaturated nitrile monomer of the first and second generally hydrophobic monomer mixture is acrylonitrile.

8. The process of claim 4 wherein the ethylenically unsaturated nitrile monomer of the first and second generally hydrophobic monomer mixture is acrylonitrile.

9. The process of claim 1 wherein the conjugated diolefin is present in the first generally hydrophobic monomer mixture in an amount of from about 50 to about 100 percent based on total weight of the first generally hydrophobic monomer mixture.

10. The process of claim 1 wherein the conjugated diolefin is present in the second generally hydrophobic monomer mixture in an amount of from about 50 to about 100 percent based on total weight of the second generally hydrophobic monomer mixture.

11. The process of claim 1 wherein the ethylenically unsaturated nitrile monomer is present in the first generally hydrophobic monomer mixture is an amount of from 0 to about 15 percent based on total weight of the first generally hydrophobic monomer mixture.

12. The process of claim 1 wherein the ethylenically unsaturated nitrile monomer is present in the second generally hydrophobic monomer mixture in an amount of from 0 to about 15 percent based on total weight of the second generally hydrophobic monomer mixture.

13. The process of claim 1 wherein the monovinylidene aromatic monomer is present in the first generally hydrophilic monomer mixture in an amount of from about 0 to about 40 percent based on total weight of the first generally hydrophobic monomer mixture.

14. The process of claim 1 wherein the monovinylidene aromatic monomer is present in the second generally hydrophilic monomer mixture in an amount of from about 0 to about 40 percent based on total weight of the second generally hydrophobic monomer mixture.

15. The process of claim 1 wherein the hydrophilic monomer is acrylonitrile.

16. The process according to claim 15 wherein the amount of acrylonitrile added to provide a generally hydrophilic surface on a polymer to be prepared from the monomers in the aqueous suspension is an amount of from about 0.2 to about 2.3 percent based on total combined weight of the aqueous phase and first generally hydrophobic monomer charge.

17. The process of claim 1 wherein the first generally hydrophobic monomer mixture is present in an amount of from about 0 to about 25 percent based on total combined weight of the first and second generally hydrophobic monomer mixture.

18. The process of claim 1 wherein the monomers graft polymerized to the graft polymerization base comprise a monovinylidene aromatic monomer and an ethylenically unsaturated nitrile monomer.

19. The process of claim 18 wherein the monovinylidene aromatic monomer is styrene.

20. The process of claim 15 wherein the ethylenically unsaturated nitrile is acrylonitrile.

21. The process of claim 20 wherein the monovinylidene aromatic monomer is styrene.

22. The process of claim 1 wherein the monomer graft polymerized to the graft polymerization base comprises a monoethylenically unsaturated carboxylic acid monomer.

23. The process of claim 22 wherein the monoethylenically unsaturated carboxylic acid monomer is methyl methacrylate.

24. The process of claim 1 wherein the second generally hydrophobic monomer mixture is continuously added to the aqueous suspension.

25. A process for preparing a latex of grafted copolymer particles, the steps of the process comprising:
(a) providing a generally hydrophobic monomer mixture, said mixture comprising a monovinylidene aromatic monomer, a conjugated diolefin, and an ethylenically unsaturated nitrile monomer;
(b) dividing said mixture into a first portion and a second portion;
(c) forming an aqueous suspension by suspending the first portion of the mixture in an aqueous phase;
(d) adding to the aqueous suspension an amount of a hydrophilic monomer, the amount being sufficient to provide a generally hydrophilic surface on a polymer to be prepared from the monomers in the aqueous suspension;
(e) initiating polymerization of the monomers present in the aqueous suspension to form an aqueous suspension of partially polymerized monomers;
(f) adding the second portion of the mixture to the aqueous suspension of partially polymerized monomers;
(g) providing a graft polymerization base by continuing polymerization of the monomers present in the aqueous suspension until achieving a conversion of monomer to polymer of at least 50 percent; the aqueous suspension to polymer; and
(h) graft polymerizing to the graft polymerization base one or more monomer selected from the group consisting of monovinylidene aromatic monomers, ethylenically unsaturated nitrile monomers, and monoethylenically unsaturated carboxylic acid monomers.

26. A process for preparing a latex of grafted copolymer particles, steps of the process comprising:
(a) providing a first generally hydrophobic monomer mixture, said mixture comprising styrene, acrylonitrile, and 1,3-butadiene;
(b) forming an aqueous suspension by suspending said mixture in an aqueous phase;
(c) adding acrylonitrile to the aqueous suspension in an amount of from about 0.2 to about 2.3 percent based on total combined weight of the aqueous phase and first generally hydrophobic monomer mixture;
(d) initiating polymerization of the monomers present in the aqueous suspension to form an aqueous suspension of partially polymerized monomers;
(e) providing a second generally hydrophobic monomer mixture, said mixture comprising styrene, acrylonitrile, and 1,3-butadiene;

(f) adding the second generally hydrophobic monomer mixture to the aqueous suspension of partially polymerized monomers;

(g) providing a graft polymerization base by continuing polymerization of the monomers present in the aqueous suspension until achieving a conversion of monomer to polymer of at least 50 percent;

(h) graft polymerizing, to the graft polymerization base one or more monomers selected from the group consisting of styrene, acrylonitrile, and methyl methacrylate.

* * * * *